Feb. 1, 1955 G. D. HULST 2,701,275

COLOR CONTROL IN TELEVISION DISPLAY APPARATUS

Filed Oct. 4, 1950 2 Sheets-Sheet 1

INVENTOR.
GEORGE D. HULST
BY Darby & Darby
ATTORNEYS

Feb. 1, 1955 G. D. HULST 2,701,275

COLOR CONTROL IN TELEVISION DISPLAY APPARATUS

Filed Oct. 4, 1950 2 Sheets-Sheet 2

INVENTOR.
GEORGE D. HULST

BY Darby & Darby

ATTORNEYS 2,701,275
Patented Feb. 1, 1955

2,701,275

COLOR CONTROL IN TELEVISION DISPLAY APPARATUS

George D. Hulst, Upper Montclair, N. J., assignor to Allen B. Du Mont Laboratories, Inc., Clifton, N. J., a corporation of Delaware Application October 4, 1950, Serial No. 188,407

11 Claims. (Cl. 178—5.4)

This invention relates to apparatus for producing color television pictures.

It has been proposed to produce color television by means of a single direct view cathode ray tube in which the fluorescent screen is composed of fine lines or small areas of red, blue, and green color producing phosphors. One difficulty in utilizing tubes of this kind has been the necessity for maintaining extremely accurate registry between the cathode ray beam and the fluorescent screen, in order that the proper color be obtained. Misregistry may be caused by variations in deflection amplitude or beam position.

An object of this invention is to produce color television utilizing a single direct view multicolor tube.

A second object is to provide television color picture producing apparatus in which registry is not an important factor, and in which changes in deflection amplitude and beam position are not important factors.

Another object is to provide a receiver for receiving color signals fully compatible with black and white transmission standards.

In accordance with the invention, color responsive photocells are positioned to receive light from a fluorescent screen of a multicolor cathode ray picture tube, and the signals from the photocells are applied selectively in negative feedback polarity to a beam intensity controlling electrode of the cathode ray tube.

Figure 1:
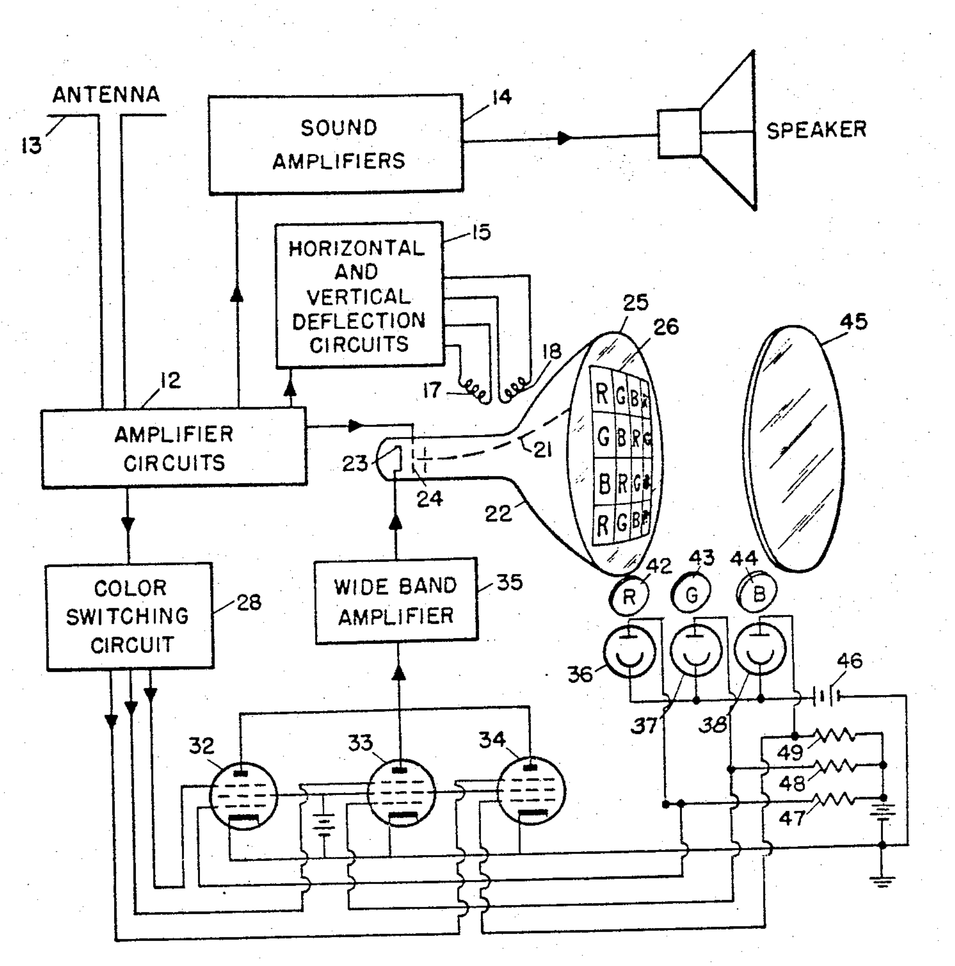
Figure 1 is a diagram, partly in schematic and partly in block form, of a receiver embodying the invention.

In Figure 1 an amplifier circuit 12 is connected to an antenna 13 and provides a source of sequential color-repetitive signals. The amplifier 12 is preferably of the usual television receiver type in which a plurality of stations are receivable in a preselective stage, heterodyned by means of a local oscillator, detected and amplified at video frequencies, the upper cutoff of picture signals being approximately 4.0 megacycles. The sound associated with the picture is preferably amplified in separate sound amplifiers 14, connected to and receiving signals from the amplifier circuits 12. Deflection circuits 15 containing horizontal and vertical deflection oscillators producing periodic waves are connected to and receive synchronization signals from the amplifier circuits 12. A horizontal electromagnetic deflection coil 17 and a vertical electromagnetic deflection coil 18 are connected to their respective deflection circuits, receiving periodic sawtooth current waves therefrom.

A cathode ray color television picture tube 22 is located in juxtaposition with the deflection coils 17 and 18. The picture tube is similar in most respects to monochrome picture tubes well known to the art, a beam 21 being controlled by beam intensity controlling electrodes comprising a cathode 23 and a control grid 24 connected to receive beam modulation signals from the picture signal amplifier 12, these electrodes forming part of an electron gun structure. The color picture tube 22 differs from the usual monochrome picture tube in having a fluorescent screen or raster area 25 composed of a multiplicity of component areas 26 which fluoresce red, green, and blue respectively when actuated by the beam 21. The component areas are preferably arranged in the manner indicated in the drawing by the letters R, G, and B, respectively, as described in the U. S. Patent 2,508,267, wherein the component areas of one color are arranged adjacent areas of different colors in order to obtain maximum single color definition for a given number of component areas.

A color switching circuit 28 is connected to and receives color determining signals from the amplifier 12. The color switching circuit 28 is connected in turn to the suppressor grids of three color switching pentodes 32, 33, and 34. The anodes of these pentodes are connected in parallel together and also to the input of a wide band amplifier 35, the output of which is connected to the cathode 23 of the color television tube 22.

Three photocells 36, 37, 38 are positioned to monitor the light emitted from all the component areas 26 in the fluorescent raster 25. One photocell 36 is of a type which is sensitive only to red light. The natural color response of the photoelectric surface is preferably enhanced by the addition of a red color filter 42 placed in the path of light between the photocell 36 and the raster area 25. Similarly the second photocell 37 is green sensitive with the aid of a green filter 43, and the third photocell 38 is blue sensitive with the aid of a blue filter 44. A semitransparent surface 45 preferably serves the several purposes of a safety glass, being a neutral filter to reduce room reflections, and augmenting the gathering of scattered light to the photocells and rendering their action thereby more efficient.

The cathodes of the photocells 36, 37, and 38 are connected in parallel to a source 46 of negative potential. The anodes of the photocells are connected respectively to separate load resistors 47, 48 and 49 and to the respective control grids of the pentodes 32, 33 and 34. These connections provide a source of control signals for the amplifier 35.

The combination of elements including the photocells 36, 37, 38, the pentodes 32, 33, 34, and the wide band amplifier 35 constitute a switching amplifier which, with the cathode ray tube 22, comprise a feedback loop which must be polarized in a negative or degenerative sense in order to obtain stability. The overall bandwidth of this feedback loop is preferably large with respect to that of the picture signal amplifier, in the order of 20 megacycles, in order to maintain a low overall time delay in this circuit.

In the absence of color signals the auxiliary circuits 32, 33, 34, which function specifically to provide color, are inoperative.

The present invention finds application in the reception of signals with color changing at field, line or dot repetition rate.

Color determining signals in the field sequential system are broadcast mixed with the scanning synchronizing signals. In the receiver shown they operate the color switching circuit 28 in a sequence to provide for red, green and blue fields. During a red field, for instance, a negative bias is applied to the suppressor grid of one tube 32 rendering it non-conductive. Simultaneously positive signals are applied to the suppressor grids of the other tubes 33 and 34 rendering these latter tubes operative.

Figure 2:
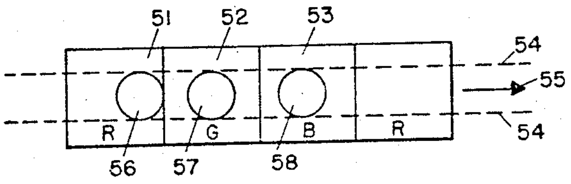
Figure 2 is a front view of a portion of a cathode ray picture tube forming a portion of the invention.
Figure 3:
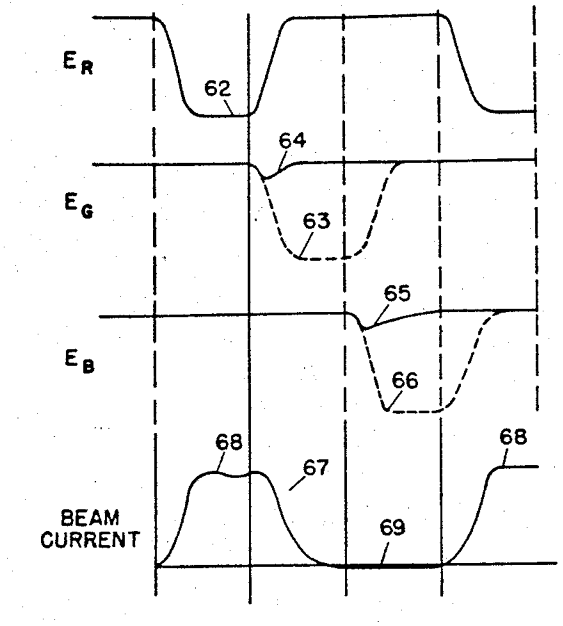
Figure 3 is a voltage wave form plotted against a time ordinate.

In the course of scanning, the electron beam 21 passes successively over a red component area 51, a green component area 52, and a blue component area 53 in a path indicated in Fig. 2 by the broken lines 54 and in a direction indicated by the arrow 55. In the absence of the feedback network, red, green, and blue light would be given out successively from all three component areas. The circle 56 represents the approximate outside diameter of the beam 21 as it strikes the fluorescent area 25, representing the position of the beam in a red fluorescing component area and about to impinge upon an adjacent green component area. As long as the beam 21 is in the red area, current flows only in the red sensitive photocell 36 and through the load resistor 47 producing a negative voltage on the control grid of the tube 32, as indicated by the numeral 62 on the curve $E_R$ in Figure 3. Since this tube is already biased by means of its suppressor grid to be non-conductive, no inverse feedback signal passes into the wide band amplifier 35, and the beam of the picture tube 25 is modulated fully, in accordance with video signals applied to the grid, by the amplifier 12.

The beam 21 passes on in the direction of the arrow 55 to impinge on a green component area 52 as indicated by the second circle 57. As it does so a current is caused to flow in the photocell 37 and the resistor 48, causing a negative voltage on the control grid of the tube 33 which, in the absence of feedback, would assume a value as represented by the dotted waveform $E_G$ of Figure 3 at the point 63. However, because the tube 33 is conductive, a negative feedback signal is amplified in the amplifier 35 and applied in a positive sense to the cathode of the picture tube 22 thereby de-activating the electron beam 21 and preventing any further buildup of the green color, as indicated by the solid waveform $E_G$ at the point 64.

The beam 21 passes on to impinge on a blue component area 53 as shown by the circle 58. A current flows in the photocell 38 and the resistor 49, causing a negative pulse on the grid of the tube 34. Because of the negative feedback the beam 21 is de-activated or reduced in intensity resulting in a voltage represented by the solid curve $E_B$ at the point 65 instead of the broken line 66.

The resultant curve of beam intensity is shown as a curve 67 of beam current. This curve represents a white or bright red picture during the scan of a red field. It will be noted that the intensity of the beam varies between a peak value 68 during the time the beam is on a red component area and a substantially zero value 69 when the beam is on a green or blue square. The peak value of signal is determined by the signal from the amplifier 12 applied to the grid 24, and the green or blue square value 69 by the degree of negative feedback.

The action of the circuit during green or blue field scans will be similar. During the scanning of a green field the tube 33 is rendered non-conductive and the tubes 32 and 34 rendered conductive by the switching circuit 28, so that the beam 21 is degenerated while passing over red and blue squares. During the scan of a blue field the tube 34 is non-conductive, the tubes 32 and 33 are conductive, and the beam 21 is degenerated during its passage over red and green areas.

The action which occurs when this invention is used for a line or dot sequential system is similar to that described above in conjunction with a field sequential system, except that color changing signals are applied to the color switching circuit 28 at faster rates. For best results the spot repetition frequency or rate at which the beam 21 passes over component areas of similar colors should be substantially faster than the rate at which colors are switched, to avoid beat effects between the two frequencies.

Since most phosphors have a decay time considerably longer than that of the spot repetition period, it is preferable to design the feedback loop to have a short time constant contained therein, preferably in an input stage of the amplifier 33 to avoid undesired degeneration from light emitted from the phosphors after the period of initial excitation, this time constant preferably being the order of magnitude of a period of the spot repetition frequency.

As an example, if a single horizontal scanning line lasts 50 microseconds and contains 250 elemental spots of a single color for a total of 750 spots, the spot repetition frequency will be 5 megacycles and the time constant of the feedback circuit should be in the order of .2 microsecond.

Figure 4:
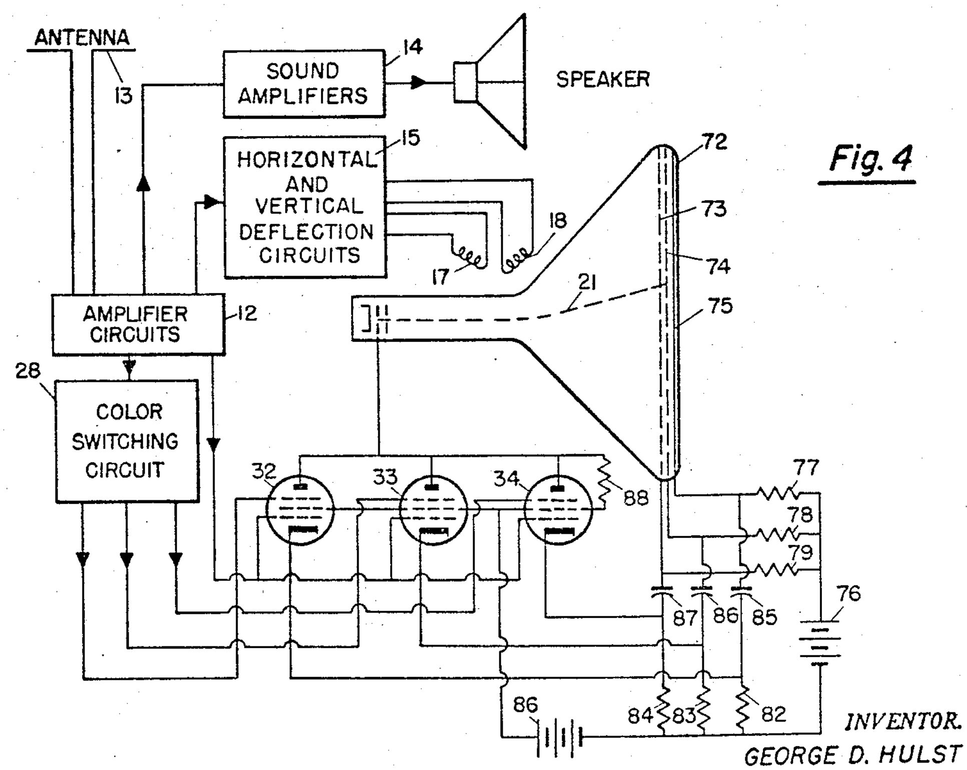
Figure 4 is a second embodiment of the invention.

A second embodiment of the invention is shown in Figure 4. In this embodiment a special color television cathode ray picture tube 72 is provided which has its separate colored fluorescent areas formed on separate conductors 73, 74, and 75, which are insulated from one another and act as targets for the beam 21. These conductors are connected to a high positive voltage source 76 through separate load resistors 77, 78, and 79. These load resistors are coupled respectively to resistors 82, 83, 84 and to the cathodes of the tubes 32, 33, and 34 by means of high voltage coupling capacitors 85, 86, 87. The resistors and condensers preferably provide a time constant in the order of magnitude of a period of the spot repetition frequency. By coupling the amplifier 12 directly to the control grids of these tubes 32, 33, 34, the latter also serve as a final stage of video amplification having a common load resistor 88 connected to a positive "B" source 89.

The action of this embodiment is similar to that described above except that in this case impingement of the beam 21 upon one of the fluorescent targets 73, 74, 75 generates a negative voltage at the cathode of the corresponding tube causing it to conduct and to generate a negative voltage in the resistor 88, thereby cutting off the beam 21 degeneratively. As the beam 21 scans the targets 73, 74, 75, it strikes the three targets one-at-a-time in rapid repetitive sequence. When the beam 21 is in the position shown in Fig. 4, for example, it passes through an opening in the target 73 and impinges upon and activates the target 74. When the beam is in other positions in the picture area, such as, for example, a slightly displaced position, it impinges upon and activates the target 73. Still further, when the beam strikes other parts of the picture screen, it passes through aligned openings in the targets 73 and 74, and impinges upon and activates the target 75. The latter condition is illustrated near the top of the picture tube of Figure 4, where apertures in screens 73 and 74 are in alignment.

Although specific embodiments have been shown and described, the scope of the invention is limited in the following claims.

What is claimed is:

1. A color television system comprising a cathode ray tube having a plurality of beam intensity, control elements and a picture area consisting of a plurality of groups of elemental areas each group producing its characteristic color scanning means to move the cathode ray beam over said picture area, a source of sequential color-representative signals connected to said control elements to modulate said beam, a degenerative feedback circuit having a plurality of input portions corresponding in number to the number of said groups and an output connection to said control elements, a switch circuit, and a source of signals connected to control said switching circuit to connect said input portions selectively to said control elements to allow said beam to reach full intensity only when scanning an area emitting light of a desired color.

2. The apparatus of claim 1 in which said switching circuit connects said plurality of input portions to said input connection to render said input portions sequentially operative in groups of two at a time.

3. The combination of claim 1 in which said input portions are photocells provided respectively with filters corresponding respectively to said characteristic colors.

4. The combination of claim 1 in which said input portions are separately insulated fluorescent targets in said raster area of said cathode ray device.

5. The combination of claim 1 in which the size of said elemental areas is approximately the same as the cross-sectional area of said electron beam and are arranged so that each said elemental area of one group has its edges in contact with edges of other areas of different groups.

6. In a color television system, a cathode ray device containing an electron gun producing an electron beam, a fluorescent raster area comprising a multiplicity of component areas yielding red, green, and blue light respectively when actuated by said beam, and a pair of electrodes controlling the intensity of said beam, a deflection coil and source of periodic sawtooth waves connected thereto to cause said beam to scan said component areas in sequence at a spot repetition frequency, a source of sequential color-representative signals connected to one of said electrodes, a plurality of sources of control signals dependent upon the intensity of said beam, said sources being respectively dependent upon the amount of red, green, and blue light yielded by said component areas, a source of color switching signals connected to be operated in accordance with the sequence of said sequential color-representative signals, said source of switching signals having a switching frequency lower than said spot repetition frequency, and a switching amplifier comprising a plurality of channels having input terminals connected respectively to said sources of control signals and connected to be switched by said source of switching signals to be conductive in sequential groups of two in accordance with said switching signals, output terminals connected to one of said electrodes, and having a bandwidth greater than said spot frequency, the polarity of connection of said amplifier being degenerative to selectively de-activate said beam in response respectively to said control signals.

7. The combination of claim 6 in which said switching amplifier incorporates a signal-responsive time constant of the order of magnitude of a period of the spot repetition frequency.

8. A television receiver comprising a cathode ray device containing an electron gun producing an electron beam, a fluorescent raster area comprising a multiplicity of component areas yielding different characteristic colors of light when actuated by said beam, and a pair of electrodes controlling the intensity of said beam, a deflection coil and sources of periodic sawtooth waves connected thereto to cause said beam to scan said raster area in lines and in fields, said component areas being scanned in sequence, a picture signal amplifier connected to one of said electrodes and to said deflection sources, said picture signal amplifier having an upper cutoff frequency, a plurality of sources of control signals each having an amplitude dependent upon the intensity of said beam, each said source being dependent respectively upon each of said characteristic colors of light, a source of periodic switching signals having a repetition rate lower in frequency than said cutoff frequency, said source of switching signals being connected to said picture signal amplifier, and a switching amplifier comprising a plurality of channels connected to be switched sequentially by said source of switching signals and having input terminals connected respectively to each of said sources of control signals, and output terminals connected to one of said electrodes, the polarity of connection of said amplifier being degenerative to selectively de-activate said beam in response respectively to said control signals.

9. A color television system comprising a picture-display means containing an electron beam source, a scanning means, a control element therefor and a picture area having a plurality of groups of elemental areas each of said groups producing individually different colors when activated by said electron beam, a source of scanning signals connected to energize said scanning means, and a degenerative feedback circuit having an output connection to said control element and comprising a plurality of channels each of said channels comprising means responsive to light of one of said groups, and a switching means connected in series with said feedback circuit and connected to be energized by said source of color-representative signals whereby said feedback channels are selectively de-activated in accordance with the sequence of said sequential color-representative signals.

10. The system in accordance with claim 9 in which said degenerative feedback circuit is connected to be actuated by said colors of said picture area by means of phototubes which are positioned to selectively respond to said colors.

11. The system in accordance with claim 9, in which said degenerative feedback circuit is connected to be actuated by said colors of said picture area by means of electrically conductive targets upon which said colors are formed.

References Cited in the file of this patent

UNITED STATES PATENTS

| | | |
|---|---|---|
| 2,415,059 | Zworykin | Jan. 28, 1947 |
| 2,473,276 | Chew | June 14, 1949 |
| 2,490,812 | Huffman | Dec. 13, 1949 |
| 2,545,325 | Weimer | Mar. 31, 1951 |
| 2,552,070 | Sziklai | May 8, 1951 |
| 2,635,141 | Bedford | Apr. 14, 1953 |

OTHER REFERENCES

"General Description of Receivers for the RCA Color Television System Which Employ the RCA Direct-View Tri-Color Kinescopes," RCA Bulletin on Color Television, April 1950.